United States Patent Office 3,157,563
Patented Nov. 17, 1964

3,157,563
SAFETY GLASS
Bernard O. Baum, Plainfield, N.J., assignor to Union
Carbide Corporation, a corporation of New York
No Drawing. Filed June 19, 1962, Ser. No. 203,479
6 Claims. (Cl. 161—204)

This invention relates to glass laminates and to safety glass laminates in particular. More specifically, this invention relates to the utilization of modified ethylene/vinyl acetate copolymers as the adhesive interlayer in glass laminates, particularly in safety glass laminates.

The bonding of materials to glass is ordinarily difficult because of the chemical inertness and non-polar nature of the glass. This problem is particularly acute in the production of laminates for use as safety glass, where a high degree of adhesion of the plastic interlayer to the glass is important to prevent splintering of the glass and the formation of sharp cutting edges when the glass is broken.

Until this invention, the best material suitable for use as the adhesive interlayer for safety glass was poly(vinyl butyral). However, the use of poly(vinyl butyral) in this regard was not satisfactory in all respects. For example, because the poly(vinyl butyral) alone was too rigid to be useful as a safety glass interlayer, it was necessary to add plasticizers to the poly(vinyl butyral) to provide it with the requisite flexibility. Plasticized poly(vinyl butyral) is very tacky under normal atmospheric conditions, however, and, to prevent "blocking" or sticking together of the plasticized poly(vinyl butyral) sheets prior to manufacture of the safety glass laminates, it was necessary to emboss the sheets to permit only a minimum of surface contact and to dust the surface of the sheets with sodium bicarbonate to reduce surface tackiness and sticking. The poly(vinyl butyral) sheets then had to be washed to remove the sodium bicarbonate and dried prior to fabrication of the safety glass laminate. The necessity for plasticizers and the several processing steps resulting therefrom rendered glass laminates employing the poly(vinyl butyral) as the adhesive interlayer too expensive for use in many applications. Furthermore, on aging of the laminate in hot direct sunlight, minor imperfections arose, such as discoloring or yellowing of the film and bubble formation between the adhesive interlayer and the glass surface, primarily as a result of the volatilization and separation of the plasticizer from the poly(vinyl butyral).

Considerable effort has been expended to find a polymer substitute for the poly(vinyl butyral) which would not need plasticization. One such substitute was a solid copolymer of ethylene and vinyl acetate containing at least about 6 weight percent polymerized vinyl acetate. Although these copolymers formed clear, tough, flexible films, they had relatively poor adhesion to glass, and, even if the vinyl acetate content of the copolymer was 30 to 40 weight percent, or higher, its adhesion to glass was not as great as desired for many applications. It was then found that the adhesion of the ethylene/vinyl acetate copolymer to glass could be improved by hydrolyzing the polymerized vinyl acetate to form polymerized vinyl alcohol units. In such instances, however, it was necessary for the polymer to initially contain from 38 to 77 weight percent polymerized vinyl acetate, of which at least 80, and preferably 96 percent, of the contained vinyl acetate was hydrolyzed. Although the hydrolysis improved the adhesion of the ethylene/vinyl acetate copolymer to glass, the hydrolyzed polymer was brittle at low temperatures. As a result, it was necessary to incorporate plasticizers in the hydrolyzed polymers to reduce their brittleness, which then gave rise to the problems previously described regarding the use of plasticized poly(vinyl butyral). Furthermore, the large amounts of vinyl acetate, the requirement for hydrolysis, and the necessity for plasticizers increased the cost of the polymer and thereby reduced its commercial suitability for use as the adhesive interlayer in glass laminates. Finally, the adhesion of the hydrolyzed ethylene/vinyl acetate copolymers to glass was still not as great as desired for many applications.

Applicant has now discovered that when an organic isocyanate is blended with the ethylene/vinyl acetate copolymer, the resulting blend has improved adhesion to glass without plasticization. In addition, the minimum amount of vinyl acetate necessary to achieve good adhesion to glass is much less than that previously required. Moreover, the resulting glass laminates are superior to those wherein poly(vinyl butyral) or ethylene/vinyl acetate copolymers, either hydrolyzed or not, are employed as the adhesive interlayer. In addition to superior strength and resistance to glass splintering, the laminates of this invention are unexpectedly and surprisingly much more resistant to weathering and bubble formation at the interlayer-glass interface than are laminates employing other materials. Extreme heat or cold has little effect on the laminates of this invention and there is little or no discoloration of the laminates even after prolonged exposure to ultraviolet radiation.

The ethylene/vinyl acetate copolymers employed in accordance with this invention can be produced by any of the known processes. One suitable manner of producing them is by contacting a mixture of ethylene and vinyl acetate with a catalytic amount of a free-radical catalyst, employing batch, semi-continuous, or continuous processes, using a stirred autoclave, a tubular reactor, or the like. The ethylene, vinyl acetate and catalyst can be added separately, or as a mixture thereof, to the pressure reactor, provided that intimate contact of the comonomers with the free-radical catalyst is achieved at the polymerization conditions.

By the term "free-radical catalyst" is meant a catalyst which forms free radicals under the polymerization conditions employed, and includes oxygen; peroxides such as hydrogen peroxide, dibenzoyl peroxide, diacetyl peroxide, di-tert-butyl peroxide, dilauroyl peroxide, perbenzoic acid, peracetic acid, and the like; azo compounds, such as azobisisobutyronitrile, and the like; etc.

In such processes, pressures of from about 900 p.s.i.g. to about 100,000 p.s.i.g. or more can be employed for the polymerization, with pressures of from about 15,000 p.s.i.g. to about 50,000 p.s.i.g., preferred. The polymerization can be conducted at temperatures of from about 40° C. to 400° C., with temperatures of from about 70° C. to about 225° C. preferred.

The process can be carried out with or without diluents, which may or may not be solvents for one or both of the monomers or for the resulting copolymer. After completion of the polymerization, the copolymer is recovered by methods known to the art.

The ethylene/vinyl acetate copolymer contains at least 1 weight percent polymerized vinyl acetate. Although the copolymer can contain up to about 50 or more weight percent polymerized vinyl acetate, it is preferred to employ copolymers containing up to about 30 weight percent polymerized vinyl acetate because amounts in excess of about 30 weight percent have little or no effect on increasing the adhesive properties of the copolymer. When the blend is to be employed in the manufacture of automotive safety glass, or in other applications requiring a clear laminate, there should be at least about 12 weight percent polymerized vinyl acetate in the copolymer to insure good clarity. The copolymer can have a melt index up to about 1,000 dgm./min. as determined according to ASTM D1238-57T, or higher, with melt indexes of from about 0.5 to about 20 dgm./min. being preferred.

The organic isocyanates which are useful in producing the isocyanate-copolymer blends employed in the laminates of this invention are represented by the formula $R(NCO)_x$ wherein $x$ is an integer having a value of at least one and R is any organic radical having a valence of $x$ and in which the valence bonds are from carbon atoms. Thus, suitable isocyanates can be monoisocyanates, polyisocyanates, and polymers containing a plurality of isocyanato groups. Preferred are polyisocyanates wherein $x$ is at least 2, with polyisocyanates wherein $x$ is 2 or 3 being especially preferred. In general, R can be a hydrocarbon moiety, such as an aliphatic moiety, an alicyclic moiety, an aromatic moiety, or can contain 2 or more of such moieties containing at least 2, and preferably from 2 to about 40 carbon atoms. R can also include radicals of the formula

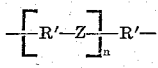

wherein $n$ is an integer having a value of at least 1, preferably from 1 to 10; Z is a divalent moiety such as —O—,

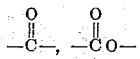

—SS—, —S—, —SO$_2$— etc. and R' is a divalent hydrocarbon moiety containing from 2 to about 40 carbon atoms. The hydrocarbon moieties of the organic isocyanates can be substituted with one or more inert groups, such as alkyl, cycloalkyl, aryl, alkoxy, aryloxy, alkanoyl, aroyl, alkanoyloxy, aroyloxy, and the like without departing from the scope of this invention.

As examples of suitable isocyanates one can mention isocyanotoethane,
isocyanatopropane,
isocyanatooctane,
isocyanatooctadecane,
isocyanatobenzene,
1-isocyanatonaphthalene,
2-isocynatonaphthalene,
1,2-diisocyanatoethane,
1,3-diisocyanatopropane,
1,2-diisocyanatopropane,
1,4-diisocyanatobutane,
1,5-diisocyanatopentane,
1,6-diisocyanatohexane,
bis(3-isocyanatopropyl) ether,
bis(3-isocyanatopropyl) sulfide,
1,7-diisocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane,
1,10-diisocyanatodecane,
1,6-diisocyanato-3-butoxyhexane,
the bis(3-isocyanatopropyl ether of 1,4-butylene glycol,
1,11-diisocyanatoundecane,
1,12-diisocyanatododecane,
bis(isocyanatohexyl) sulfide,
1,4-diisocyanatobenzene,
2,4-diisocyanatotoluene,
1,3-diisocyanato-4,5-dimethylbenzene,
2,4-diisocyanato-1-chlorobenzene,
2,4-diisocyanato-1-nitrobenzene,
2,5-diisocyanato-1-nitrobenzene,
4,6-diisocyanato-1,4-dichlorobenzene,
2,5-diisocyanato-1-chloro-4-methoxybenzene,
2,5-diisocyanato-1-methoxybenzene,
2,4-diisocyanato-1-methoxybenzene,
2,5-diisocyanato-1-methyl-4-methoxybenzene,
2,4-diisocyanato-1-ethylbenzene,
2,4-diisocyanato-1-ethoxybenzene,
4,6-diisocyanato-1,3-dimethoxybenzene,
2,5-diisocyanato-1,4-dimethoxybenzene,
2,4-diisocyanato-1-propylbenzene,
2,4-diisocyanato-1-isobutylbenzene,
2,4-diisocyanato-1-isobutoxybenzene,
2,5-diisocyanato-1,4-diethoxybenzene,
1,3-diisocyanatocyclohexane,
1,4-diisocyanatocyclohexane,
1,4-diisocyanatonaphthalene,
1,5-diisocyanatonaphthalene,
2,6-diisocyanatonaphthalene,
2,7-diisocyanatonaphthalene,
1-(isocyanatomethyl)-2-(3-isocyanatopropyl)-3,5-dimethylcyclohexane,
1,3-bis(4-isocyanatophenyl)propane,
$\alpha,\beta$-bis(2-isocyanatoethyl)-9,10-endoethylene dihydroanthracene,
2,4-diisocyanato-1-methylcyclohexane,
2,4-diisocyanato-1-methylcyclohexane,
2,4-diisocyanato-1-ethylcyclohexane,
bis(4-isocyanatocyclohexyl)methane,
1,1-bis(4-isocyanatocyclohexyl)ethane,
2,2-bis(4-isocyanatocyclohexyl)propane,
bis(2-methyl-4-isocyanatohexyl)methane,
bis(3,5-dimethyl-4-isocyanatohexyl)methane,
1-isocyanatomethyl-4-isocyanatobenzene,
1-(2-isocyanatoethyl)-4-isocyanatobenzene,
1-(2-isocyanatoethyl)-3-isocyanatobenzene,
1-(3-isocyanatopropyl)-4-isocyanatobenzene,
1-(4-isocyanatobutyl)-4-isocyanatobenzene,
1,5-diisocyanatotetrahydronaphthalene,
4,4'-diisocyanatoazobenzene,
2-methyl-4,4'-diisocyanatoazobenzene,
4,4'-diisocyanato-1-naphthaleneazobenzene,
2,4-diisocyanatodiphenyl ether,
dianisidine diisocyanate,
ethylene glycol bis(4-isocyanatophenyl) ether,
diethylene glycol bis(4-isocyanatophenyl) ether,
2,2'-diisocyanatobiphenyl,
2,4-diisocyanatobiphenyl,
4,4'-diisocyanatobiphenyl,
3,3'-dimethoxy-4,4'-diisocyanatobiphenyl,
3,3'-dimethyl-4,4'-diisocyanatobiphenyl,
3,3'-dimethyl-4,4'-diisocyanatobiphenyl,
2-nitro-4,4'-diisocyanatobiphenyl,
bis(4-isocyanatophenyl)methane,
bis(2-methyl-4-isocyanatophenyl)methane,
2,2-bis(4-isocyanatophenyl)propane,
bis(2,5-dimethyl-4-isocyanatophenyl)methane,
cyclohexyl-bis(4-isocyanatophenyl)methane,
bis(3-methoxy-4-isocyanatophenyl)methane,
bis(4-methoxy-3-isocyanatophenyl)methane,
bis(2-methyl-5-methoxy-4-isocyanatophenyl)methane,
2,2-bis(3-chloro-4-isocyanatophenyl)propane,
3,3'-diisocyanatobenzophenone,
2,4-diisocyanatobibenzyl,
p-nitrophenyl-bis(4-isocyanatophenyl)methane,
phenyl-bis(2,5-dimethyl-4-isocyanatophenyl)methane,
2,7-diisocyanatofluorene,
2,6-diisocyanatophenanthroquinone,
3,6-diisocyanato-9-ethylcarbazole,
3,8-diisocyanatopyrene,
2,8-diisocyanatochrysene, 2,4-diisocyanatodiphenylsulfide,
bis(4-isocyanatophenyl)sulfide,
bis(4-isocyanatophenyl)sulfone,
bis(4-isocyanatobenzyl)sulfone,
2,4'-diisocyanato-4-methyldiphenylsulfone,
4-methyl-3-isocyanatobenzylsulfonyl-4'-isocyanato-
  phenyl ester,
4-methoxy-3-isocyanatobenzylsulfonyl-4'-isocyanato-
  phenyl ester,
bis(2-methyl-4-isocyanatophenyl)disulfide,
bis(3-methyl-4-isocyanatophenyl)disulfide,
bis(4-methyl-3-isocyanatophenyl)disulfide,
bis(4-methoxy-3-isocyanatophenyl)disulfide,
bis(3-methoxy-4-isocyanatophenyl)disulfide,
4-methyl-3-isocyanatobenzylsulfonyl-4'-isocyanato-3'-
  methylanilide,
N,N'-bis(4-isocyanatobenzylsulfonyl)1,2-diaminoethane,
bis(3-methoxy-4-isocyanatobenzyl)sulfone,
1,2-bis(4-methoxy-3-isocyanatobenzylsulfonyl)ethane,
N,N'-bis(4-methoxy-3-isocyanatobenzyl)-1,2-diamino-
  ethane,
2,4,6-triisocyanatotoluene,
triisocyanatomesitylene,
1,3,7-triisocyanatonaphthalene,
2,4,4'-triisocyanatodiphenylmethane,
bis(2,5-diisocyanato-4-methylphenyl)methane,
tris(4-isocyanatophenyl)methane,
N,N-bis(4-isocyanatophenyl)carbamyl acid chloride, and the like. Preferred organic polyisocyanates are the diisocyanates, particularly the aromatic diisocyanates wherein the —N=C= groups are on different aromatic rings, e.g. 2,4-diisocyanatotoluene and dianisidine diisocyanate (3-methoxy-4-isocyanatobiphenyl).

In general, the amount of isocyanate which is employed in the blend of the isocyanate with the ethylene/vinyl acetate copolymer can vary from about 0.1 to about 20 or more weight percent of the isocyanate, based on the total weight of the resulting blend. Amounts higher than 20 weight percent can be employed if desired, but afford no particular advantages. Amounts of from 0.5 to about 10 weight percent of the isocyanate are preferred, with from about 1 to about 5 weight percent being especially preferred.

The isocyanate can be incorporated in the ethylene/vinyl acetate copolymer by conventional blending procedures, such as by milling, kneeding, and the like, or can be added to a solution of the ethylene/vinyl acetate copolymer in an inorganic solvent.

The solvation method is preferred when the ethylene/vinyl acetate copolymer is produced by solution techniques whereby the polymer is recovered in solution in an inert organic solvent. Suitable solvents are those aliphatic and aromatic hydrocarbons and their derivatives in which polyethylene is soluble at elevated temperatures. As examples of such solvents one can mention aliphatic compounds such as hexane, heptane, octane, and the like; cycloaliphatic compounds, such as methylcyclohexane, cyclohexane, decalin, and the like; aromatic compounds, such as benzene, toluene, xylene, tetralin, styrene, and the like; carbonyl-containing compounds, such as amyl acetate, cyclohexanone, and the like; halogenated hydrocarbons, such as tetrachloroethylene, 1,1,2-trichloroethylene, carbon tetrachloride, hexachloropropane, trichlorocumene, tetrachloroethane, hexachlorobutadiene, 1,1,2-trichloroethane, 1,2-dichloroethane, and the like; petroleum ether, lubricating oil, solvent naphtha, and the like; turpentine; etc.

Where solution procedures are employed for producing the isocyanate-copolymer blend and the ethylene/vinyl acetate copolymer is recovered from the polymerization as a solid, the copolymer is dissolved in the inert organic solvent at temperatures in excess of about 70° C., with temperatures of from about 80° C. to 100° C. preferred. The copolymer solution can have from about 1 weight percent or less to about 30 weight percent or more of the copolymer and from about 99 percent or more to about 70 percent or less of solvent, with solutions containing from about 5 percent to about 20 percent copolymer and from about 95 percent to about 80 percent solvent being preferred. The isocyanate can then be added to the solution, mixed, and the solvent evaporated to recover the isocyanate-copolymer blend.

In producing the glass laminates of this invention, the blend of the isocyanate and the ethylene/vinyl acetate copolymer can be applied to the glass by any of several techniques. A preferred method is by forming a sheet of the copolymer blend and applying the formed sheet to the glass under heat and pressure to form the polymer-glass bond. Other methods can be employed with equal ease, however, such as by applying the solution of the isocyanate-copolymer blend in an inert organic solvent to the glass surface and evaporating off the solvent, whereby a thin coating of the isocyanate ethylene/vinyl acetate copolymer blend is formed on the glass. This method is particularly desirable where the isocyanate is blended with the ethylene/vinyl acetate copolymer in solution.

When the isocyanate-ethylene/vinyl acetate copolymer blend is to be employed as the adhesive interlayer for safety glass, it is preferred to form a sheet of the isocyanate-copolymer blend by conventional procedures, such as calendering, extrusion, or the like, make a glass-copolymer blend-glass sandwich, and then apply heat and pressure to effect the bonding of the copolymer blend to the glass. In general, pressures of from about 50 p.s.i.g. to about 20,000 p.s.i.g. are preferred. Temperatures of from about 40° C. to about 200° C. generally can be employed, with temperatures of from about 80° C. to about 150° C. being especially preferred.

As an alternative procedure, the ethylene/vinyl acetate copolymer alone can be formed into a sheet and a thin layer of isocyanate applied either to the surface of the glass or the surface of the ethylene/vinyl acetate copolymer sheet. The laminate is then formed as described above. The isocyanate can be applied to the selected surface in solution and the solvent evaporated, whereby a layer of isocyanate is deposited on the selected surface or, if the isocyanate is a liquid, it can be applied directly to the selected surface without the use of solvents. When such procedures are employed a thin layer of isocyanate-copolymer blend is formed along the interlayer-glass interface as a result of the heat and pressure employed in pressing the laminate.

Because the adhesion of the isocyanate-ethylene/vinyl acetate copolymer blend is a surface phenomenon, neither the thickness of the interlayer nor the thickness of the glass is of particular criticality. Where the laminates of this invention are to be employed as automotive safety glass, however, it is preferred that the laminates consist of two glass sheets bonded together by a copolymer film of from about 5 mils to about 20 mils thick, the resulting laminate having a thickness of from about 3/16 inch to about 1/4 inch.

Although much of the foregoing discussion has been specifically directed to glass laminates, and to safety glass laminates in particular, it is within the concept of this invention that only one sheet of glass may be bonded to the isocyanate-ethylene/vinyl acetate copolymer blend for applications such as protection of the surface of laboratory glassware from corrosive attack, or for heat bonding of the glass-copolymer blend laminate through the copolymer blend layer to a non-glass surface, such as metal, wood, plastic, and the like. Furthermore, although glass sheets have been primarily described, the isocyanate-ethylene/vinyl acetate copolymer blend can be bonded to any shaped glass surface, such as non-planar sheets, bottles, rods, filaments, fibers, and the like. Accordingly, the term "glass layer" or variations thereof, as employed throughout the specification and claims includes all forms of glass to which the isocyanate-ethylene/vinyl acetate copolymer blend is bonded.

If desired, various additives, such as dyes, pigments, and tints can be incorporated in the isocyanate-ethylene/vinyl acetate copolymer blend without impairing its adhesion to glass. Furthermore, although plasticizers and the like are ordinarily unnecessary, they may be added if desired.

The blend of organic isocyanate and the ethylene/vinyl acetate copolymer is essentially a physical admixture. That is, the isocyanate does not react to a significant degree with the ethylene/vinyl acetate copolymer. However, it is possible that, due to the presence of small amounts of water, the copolymer may be hydrolyzed to a minor degree. In such a case, the isocyanate may react with the resulting pendant hydroxyl groups and, if a polyisocyanate is employed, the copolymer may be lightly crosslinked. Nevertheless, such a composition is still essentially a blend of an essentially unhydrolyzed copolymer and an isocyanate within the scope of this invention.

The following examples are illustrative.

In each example, a polyisocyanate-copolymer blend was produced by milling an organic polyisocyanate with an ethylene/vinyl acetate copolymer at a temperature of 110° C. on a two-roll mill employing ten end passes. The resulting polyisocyanate-copolymer blend was then pressed into a sheet at 110° C. and 500 p.s.i. The resulting sheet was placed between two sheets of glass and the resulting sandwich was heated to 150° C. and subjected to sufficient pressure to eliminate all air bubbles whereby a safety glass laminate was formed.

Example I

A glass laminate was produced using a blend containing 1 weight percent bis(4-isocyanatophenyl)methane and 99 weight percent of an ethylene/vinyl acetate copolymer containing 22 weight percent polymerized vinyl acetate having a melt index of 6 dgm./min., as determined according to ASTM D-1238-57T. The glass laminate was clear and colorless, even after 500 hours exposure in an X1A Weatherometer and after 2 days in an air oven at 260° F. No bubbles were observed, either in the interlayer or at the interlayer-glass interface, after immersion of the laminate for 6 hours in boiling water. The glass remained bonded to the polyisocyanate-ethylene/vinyl acetate copolymer layer after cooling the laminate to 0° F. and smashing it with a hammer.

Example II

Employing the ethylene/vinyl acetate copolymer described in Example I, several polyisocyanate-copolymer blends, each of which contained 1 weight percent of a different organic polyisocyanate, were evaluated as the adhesive interlayer for safety glass. The polyisocyanates which were employed were:

(1) Tolylene diisocyanate
(2) Bitolylene diisocyanate
(3) Dianisidine diisocyanate
(4) Meta-xylylene diisocyanate
(5) Bis(3-methyl-4-isocyanatophenyl)methane
(6) Bis(4-isocyanatophenyl)methane
(7) An adduct of 60 weight percent tolylene diisocyanate and 40 weight percent polyethylene oxide having a reduced viscosity of 1.4 as determined at 27° C. from a solution of 0.2 gram of the polyethylene oxide in 100 milliliters of water
(8) An adduct of 60 weight percent bis(2-isocyanatoethyl)carbonate and 40 weight percent polyethylene oxide
(9) Mondur S; a stabilized organic polyisocyanate adduct having a specific gravity of 1.26–1.28, containing 95% solids, and having 11.5–13.5% available isocyanate groups. A product of Mobay Chemical Co.
(10) Polymethylene polyphenyl isocyanate All the laminates produced employing these isocyanates in the adhesive interlayer were bubble-free after 6 hours immersion in boiling water and the glass remained bonded to the interlayer after smashing the laminate at room temperature (74° F.) with a hammer. A laminate produced using the ethylene/vinyl acetate copolymer alone, i.e., without added polyisocyanate, as the adhesive interlayer exhibited severe bubbling after the boiling water test and shattered after being smashed with a hammer.

From this example it is apparent that organic isocyanates, whether monomeric, as exemplified by isocyanates 1–5, or polymeric, as exemplified by isocyanates 7–10, when blended with an ethylene/vinyl acetate copolymer impart to the copolymer an improved adhesion to glass.

Example III

A blend containing 0.5 weight percent dianisidene diisocyanate and 99.5 weight percent of an ethylene/vinyl acetate copolymer containing 17.7 weight percent polymerized vinyl acetate and having a melt index of 10.8 dgm./min. was formed into a glass laminate. Two additional laminates were formed, substituting an ethylene/vinyl acetate copolymer containing 30 weight percent polymerized vinyl acetate and having a melt index of 1.5 dgm./min. and an ethylene/vinyl acetate copolymer containing 40 weight percent polymerized vinyl acetate and having a melt index of 2.5 dgm./min. for the copolymer first described. The three laminates were evaluated according to the following specifications considered to be required for use of the laminate as safety glass:

(1) The laminate must be clear and colorless.
(2) The glass must not separate from the adhesive interlayer after cooling the laminate to 32° F., placing it on a steel plate, and crushing it with a hammer.
(3) There must be no or only a few bubbles in the adhesive interlayer or at the interlayer-glass interface after immersion of the laminate in boiling water for 6 hours.
(4) The laminate must not be discolored after 500 hours exposure in an X1A Weatherometer.
(5) The laminate must not be discolored and must have no or only a few scattered bubbles after being heated in an air oven for 2 days at 260° F.

All three laminates were clear and colorless. The glass did not separate from the plastic interlayer after crushing of the laminates. No bubbles formed either in the interlayer or at the glass-interlayer interface after immersion of the laminates in boiling water, and no discoloration or bubble formation was observed after the X1A Weatherometer or oven tests.

Laminates produced using the ethylene/vinyl acetate copolymers alone, i.e., without added diisocyanate, as the adhesive interlayer, all exhibited severe bubbling after immersion in boiling water for 6 hours and shattered, exposing the plastic interlayer, after cooling to 32° F. and smashing with a hammer.

Example IV

Various amounts of dianiside diisocyanate were blended with an ethylene/vinyl acetate copolymer containing 17.7 weight percent polymerized vinyl acetate and having a melt index of 10.8 dgm./min. The resulting blends were then employed as the adhesive interlayer in glass laminates which were evaluated for adhesion and for visual clarity by the following tests.

(1) *Impact test.*—Groups of glass laminates were maintained at 140° F. and smashed with a hammer in a uniform manner to determine the degree of adhesion of the glass to copolymer after impact. The samples were rated as follows:

A=Excellent; no bare spots on the interlayer, the glass could not be separated from the interlayer by hand.
B=Good; no bare spots on the interlayer, and glass splinters and pieces could be separated from the interlayer by hand only with difficulty.
C=Fair; some bare spots on the interlayer, and glass splinters were easily separated from the interlayer by hand.

D=Poor; many large bare spots; little or no adhesive.

(2) *Visual clarity.*—The laminates were visually rated as follows:
A=Excellent, no haze.
B=Good, slight haze for distant objects.
C=Fair, hazy.
D=Poor, translucent.

The results of these tests are set forth in tabular form below, together with the amount of dianisidine diisocyanate present in the blend.

| Dianisidine Diisocyanate in Blend, Weight Percent | Impact Test | Visual Clarity |
|---|---|---|
| 0 | D | A |
| 0.125 | C | A |
| 0.25 | C–B | A |
| 0.50 | B | A |
| 1.0 | A | A |
| 6 | A | B |
| 10 | A | C |
| 20 | A | C–D |

From the table it is apparent that maximum adhesion is achieved when amounts of dianisidine diisocyanate of at least about 1 weight percent are employed, but that clarity decreases when amounts of polyisocyanate in excess of about 5 weight percent are employed. Thus, where the laminates are to be employed for uses requiring both good adhesion and clarity, it is preferred that from 1 to about 5 weight per cent polyisocyanate be employed. However, the laminates are sufficiently clear at concentrations of up to about 10 weight percent diisocyanate to be suitable for most applications where clarity is important.

*Example V*

A blend of an ethylene/vinyl acetate copolymer containing 17.7 weight percent vinyl acetate and having a melt index of 10.8 dgm./min., and 0.5 weight percent dianisidine diisocyanate, based on the weight of said copolymer, was formed into a glass laminate. The resulting laminates were evaluated at −22° F., 32° F., and 140° F. according to the impact test of Example IV and according to the boiling water test of Example I. The results of these tests are set forth in tabular form below, together with the results of equivalent tests conducted on laminates employing plasticized poly(vinyl butyral) as the adhesive interlayer, for purposes of comparison:

| Test | Dianisidine Diisocyanate-Ethylene/Vinyl Acetate Copolymer Blend | Poly(vinyl butyral) |
|---|---|---|
| Impact: | | |
| −22° F. | A | C. |
| 32° F. | A | B–A. |
| 140° F. | B | C. |
| Boiling water test | No bubbles | Several bubbles. |

What is claimed is:

1. A glass laminate composed of at least one layer of glass and directly bonded thereto, a layer of a physical admixture of an organic polyisocyanate and an essentially unhydrolyzed ethylene/vinyl acetate copolymer, said copolymer containing from 1 to 50 weight percent polymerized vinyl acetate, said admixture containing from 0.1 to 20 weight percent, based upon total admixture weight, of said polyisocyanate.

2. A glass laminate composed of at least one layer of glass and directly bonded thereto a layer of a physical admixture of an organic polyisocyanate and an essentially unhydrolyzed ethylene/vinyl acetate copolymer, said copolymer containing from 12 to 30 weight percent polymerized vinyl acetate, said admixture containing from 0.5 to 10 weight percent, based upon total admixture weight, of said polyisocyanate.

3. A glass laminate composed of at least one layer of glass and directly bonded thereto, a layer of a physical admixture of an organic polyisocyanate and an essentially unhydrolyzed ethylene/vinyl acetate copolymer, said copolymer containing from 12 to 30 weight percent polymerized vinyl acetate, said admixture containing from 1 to 5 weight percent, based upon total admixture weight, of said polyisocyanate.

4. A glass laminate composed of two layers of glass and directly bonded thereto an interposed layer of a physical admixture of an organic polyisocyanate and an essentially unhydrolyzed ethylene/vinyl acetate copolymer, said copolymer containing from 1 to 50 weight percent polymerized vinyl acetate, said admixture containing from 0.1 to 20 weight percent, based on total admixture weight, of said polyisocyanate.

5. A glass laminate composed of two layers of glass and directly bonded thereto, an interposed layer of a physical admixture of an organic polyisocyanate and an essentially unhydrolyzed ethylene/vinyl acetate copolymer, said copolymer containing from 12 to 30 weight percent polymerized vinyl acetate, said admixture containing from 0.5 to 10 weight percent, based on total admixture weight, of said polyisocyanate.

6. A glass laminate composed of two layers of glass and directly bonded thereto an interposed layer of a physical admixture of an organic polyisocyanate and an essentially unhydrolyzed ethylene/vinyl acetate copolymer, said copolymer containing from 12 to 30 weight percent polymerized vinyl acetate, said admixture containing from 1 to 5 weight percent, based on total admixture weight, of said polyisocyanate.

References Cited in the file of this patent
UNITED STATES PATENTS

| | | |
|---|---|---|
| 2,386,347 | Roland | Oct. 9, 1945 |
| 2,425,568 | Ryan et al. | Aug. 12, 1947 |
| 2,430,479 | Pratt et al. | Nov. 11, 1947 |